United States Patent
Princivalle

(10) Patent No.: US 12,503,959 B2
(45) Date of Patent: Dec. 23, 2025

(54) AIR-OIL HEAT EXCHANGER COMPRISING DIVERGENT PARIETAL CHANNELS

(71) Applicant: SAFRAN AERO BOOSTERS, Herstal (BE)

(72) Inventor: Rémy Henri Pierre Princivalle, Herstal (BE)

(73) Assignee: SAFRAN AERO BOOSTERS, Herstal (BE)

( * ) Notice: Subject to any disclaimer, the term of this patent is extended or adjusted under 35 U.S.C. 154(b) by 0 days.

(21) Appl. No.: 18/857,257

(22) PCT Filed: Apr. 20, 2023

(86) PCT No.: PCT/EP2023/060236
§ 371 (c)(1),
(2) Date: Oct. 16, 2024

(87) PCT Pub. No.: WO2023/203118
PCT Pub. Date: Oct. 26, 2023

(65) Prior Publication Data
US 2025/0264038 A1    Aug. 21, 2025

(30) Foreign Application Priority Data
Apr. 20, 2022    (BE) .................................. 2022/5288

(51) Int. Cl.
*F01D 25/12* (2006.01)
*F01D 9/06* (2006.01)
(Continued)

(52) U.S. Cl.
CPC ............. *F01D 25/12* (2013.01); *F01D 9/065* (2013.01); *F02K 3/115* (2013.01); *F28F 13/08* (2013.01); *F05D 2260/213* (2013.01)

(58) Field of Classification Search
CPC .......... F01D 9/065; F01D 25/08; F01D 25/12; F01D 25/18; F05D 2260/98;
(Continued)

(56) References Cited

U.S. PATENT DOCUMENTS

| 1,825,321 A | 9/1931 | La Mont et al. |
| 11,262,144 B2 * | 3/2022 | Breeze-Stringfellow ................... F02K 3/06 |

(Continued)

FOREIGN PATENT DOCUMENTS

| EP | 3674531 A1 | 7/2020 |
| EP | 3696389 A1 | 8/2020 |

(Continued)

OTHER PUBLICATIONS

International Search Report for PCT/EP2023/060236, dated May 10, 2023, 2 pages (English Translation).
(Continued)

*Primary Examiner* — Brian P Wolcott
(74) *Attorney, Agent, or Firm* — RANKIN, HILL & CLARK LLP

(57) ABSTRACT

An air/oil heat exchanger arranged in a vein. The exchanger includes internal parietal corridors and/or external parietal corridors and central corridors, the radial height of the internal and/or external parietal corridors increasing from the inlet of the exchanger to its outlet.

17 Claims, 4 Drawing Sheets

(51) Int. Cl.
*F02K 3/115* (2006.01)
*F28F 13/08* (2006.01)

(58) Field of Classification Search
CPC ........... F05D 2260/20; F05D 2260/213; F28F 13/08; F02C 7/14; F28D 2021/0026
See application file for complete search history.

(56) References Cited

U.S. PATENT DOCUMENTS

| | | |
|---|---|---|
| 11,927,134 B1 * | 3/2024 | Schimmels ............. F01D 25/12 |
| 2019/0204010 A1 * | 7/2019 | Breeze-Stringfellow .................... F28F 13/08 |
| 2023/0043809 A1 * | 2/2023 | Schimmels ............... F28D 7/16 |

FOREIGN PATENT DOCUMENTS

| | | | |
|---|---|---|---|
| FR | 1003131 A | 3/1952 | |
| FR | 3103221 A1 | 5/2021 | |

OTHER PUBLICATIONS

International Search Report and Written Opinion for PCT/EP2023/060236, dated May 10, 2023, 11 pages.

\* cited by examiner

[Fig 1]
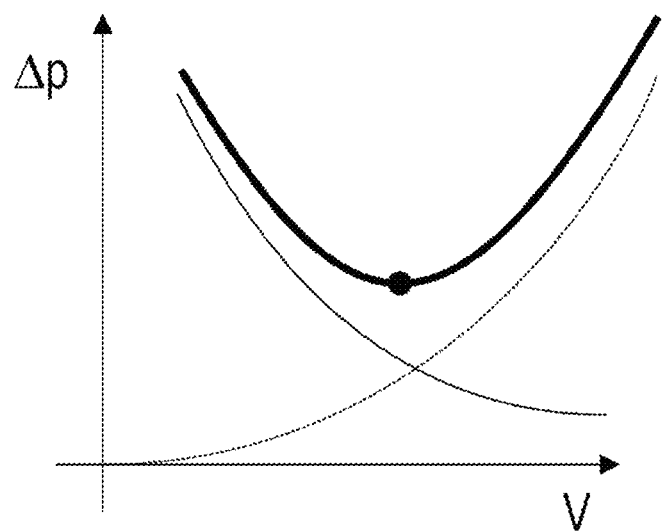
[Fig 2]
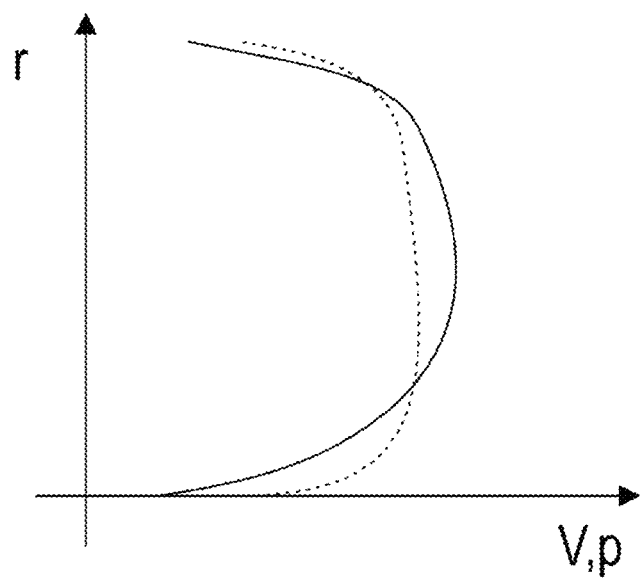

[Fig 3]
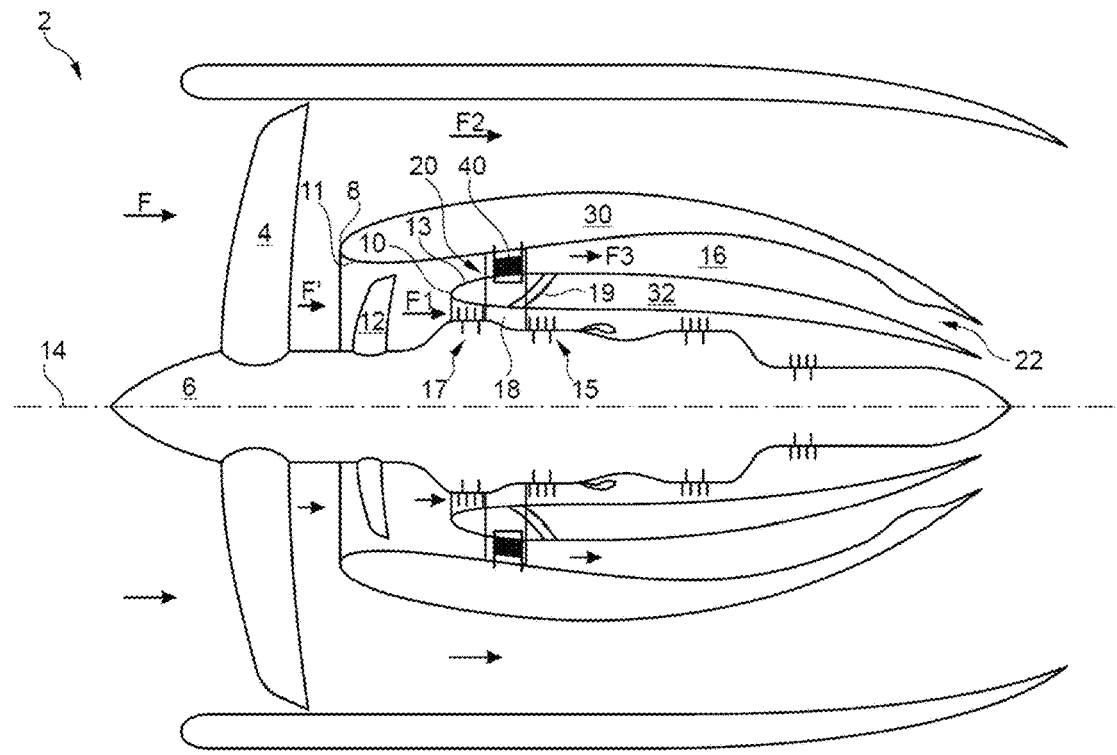
[Fig 4]
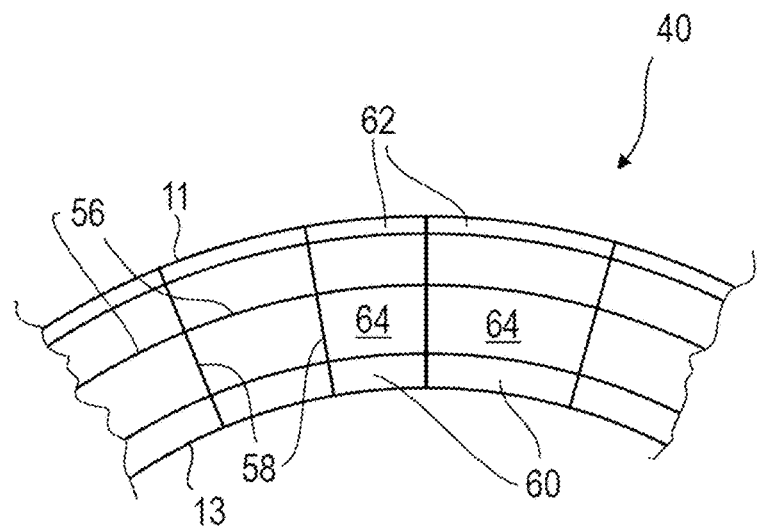

[Fig 5]
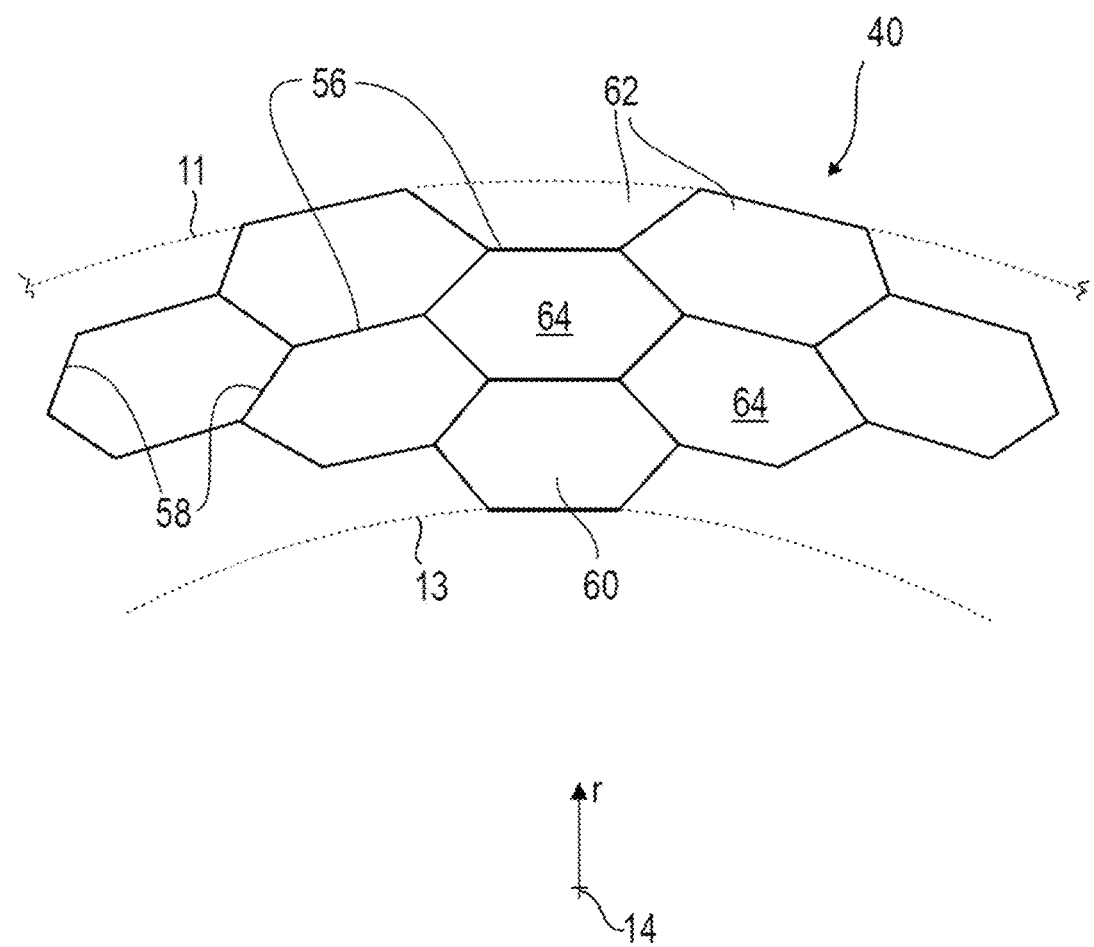

[Fig 6]
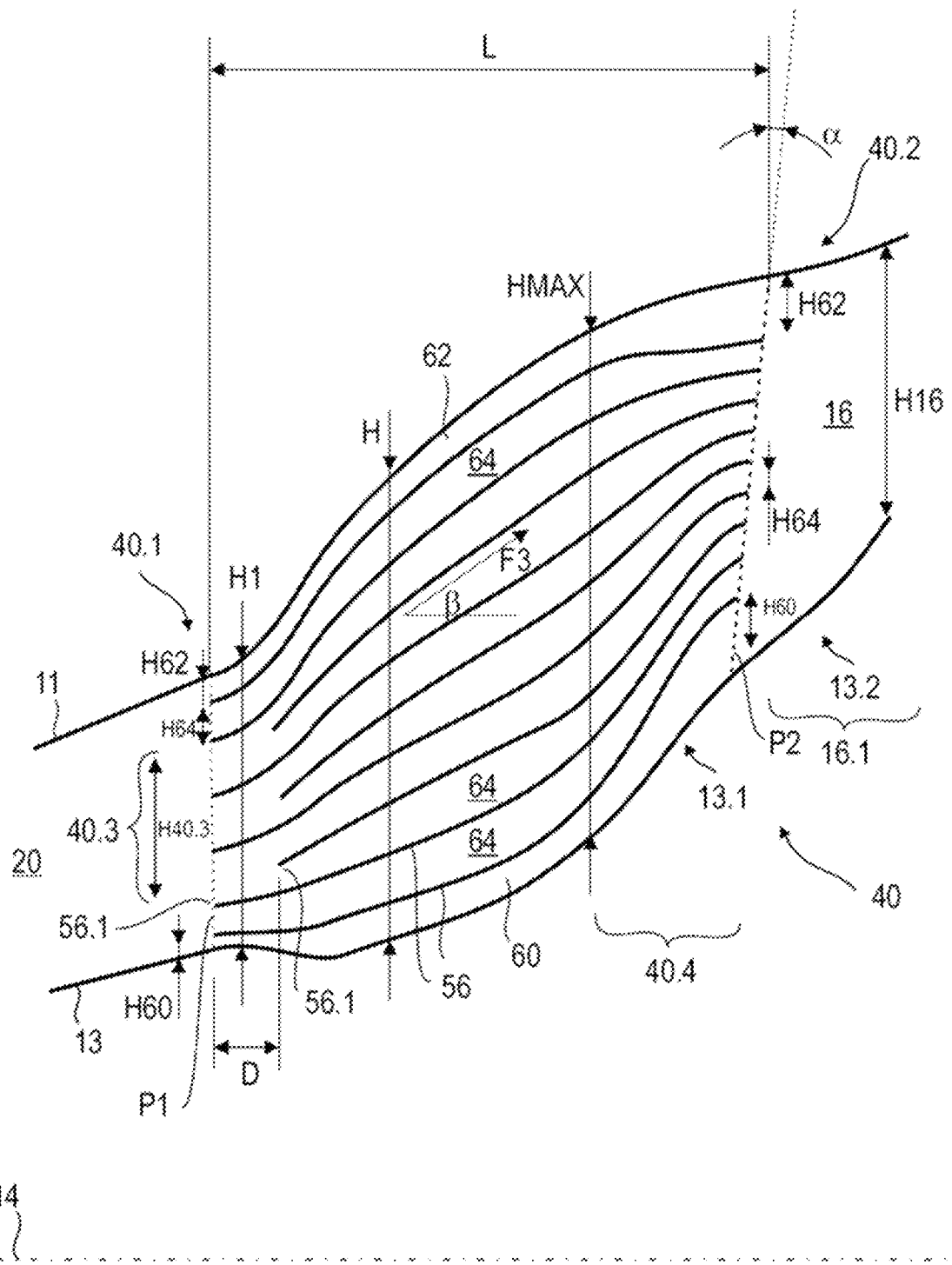

AIR-OIL HEAT EXCHANGER COMPRISING DIVERGENT PARIETAL CHANNELS

TECHNICAL FIELD

The invention relates to the field of turbomachine heat exchangers. More specifically, the invention proposes a turbomachine air/oil heat exchanger.

PRIOR ART

In a turbomachine (turbojet), it is generally necessary to cool the oil in the lubrication circuit. Since cold air is abundant during a flight, one or more heat exchangers are generally arranged in the turbomachine to cool the oil by means of an air flow.

Documents EP 3 674 531 A1 and EP 3 696 389 A1 describe air/oil exchangers for aircraft. These exchangers comprise internal passages through which the air flows and partitions, some of which are hollow to allow the oil to flow. These exchangers have a general shape designed to facilitate the flow of air around and in the exchanger.

In fact, in addition to its oil cooling function, the air flow passing through the exchanger also has the function of generating thrust for the aircraft and it is therefore important to limit losses due to friction of this flow on/in the exchanger.

While it is tempting to provide large heat exchange surfaces (to increase exchange efficiency), large heat exchange surfaces create as much friction with the air, which reduces thrust, or requires more energy (and consumption) to obtain a given thrust.

Since surface friction is proportional to the square of the speed, it is also possible to try to limit friction by slowing down the air flow. The space constraints of the exchangers mean that the slowdown rate is limited: to reduce losses due to friction, it is tempting to significantly reduce the speed, but beyond a certain slowdown rate, the loss of pressure in the flow becomes greater than what the slowdown would allow to gain on friction.

There is therefore an optimal operating point, for a speed which is neither too low (pressure losses due to deceleration), nor too high (pressure losses due to friction).

This optimum is illustrated in FIG. 1: the pressure loss is illustrated as a function of the flow velocity, the loss being the sum of the loss (decreasing curve in solid line) due to deceleration and the loss (increasing curve in dotted line) due to friction.

These curves represent the overall view of the entire flow but the flow velocity and total flow pressure are not uniform over the entire radial height of the flow.

FIG. 2 illustrates these variations: the dotted line shows the variation in axial velocity and the continuous line shows the variation in total pressure; the ordinate axis represents the radial height.

The speed and total pressure of the flow vary but are especially significantly lower in the vicinity of the radially internal and external walls that delimit the air flow. Since the flow rate in each corridor of the exchanger is proportional to the difference between the total pressure at the exchanger inlet and the static pressure at the exchanger outlet, and since the static pressure at the exchanger outlet is homogeneous (boundary condition), the flow rate in the radially internal or external corridors is much lower than the flow rate in the corridors in the middle of the air stream.

Thus, in known exchangers, the overall flow rate will essentially go to the center of the exchanger and the radially inner and outer corridors will receive little air flow and will therefore be inefficient in heat exchange.

SUMMARY OF THE INVENTION

Technical Problem

Based on the observation made above by the inventors of the present invention, a margin of improvement is highlighted for the design of the exchangers. Thus, the present invention aims to propose a heat exchanger which optimizes the compromise between aerodynamic losses and efficiency of the heat exchange.

Technical Solution

The invention relates to an air/oil heat exchanger comprising a radially internal wall, a radially external wall, and partitions, some of which are hollow and through which the oil flows, the partitions and the walls delimiting corridors among which internal parietal corridors and/or external parietal corridors delimited by the radially internal and/or external walls and the adjoining partitions, and central corridors at a distance from the walls and delimited only by the partitions, the corridors allowing the air flow to pass through the exchanger, wherein the radial height of the internal parietal corridors and/or of the external parietal corridors increases monotonically from the inlet of the exchanger to its exit.

This design plays in particular on the aspect of increasing the flow rate of the parietal corridors and therefore the homogeneity of the speeds at the inlet of the exchanger.

According to an advantageous embodiment of the invention, at the inlet of the exchanger, the internal and/or external parietal corridors have a radial height lower than the radial height of the central corridors, and preferably the height of the internal and/or external parietal corridors is half that of the central corridors.

Such a reduction allows the boundary layer (at the walls at the inlet of the exchanger) to be sucked in with the parietal corridors. This increases the velocity at the inlet of the exchanger at the parietal corridors and therefore makes the inlet velocity field more homogeneous.

According to an advantageous embodiment of the invention, at the outlet of the exchanger, the internal and/or external parietal corridors have a radial height greater than the radial height of the central corridors, and preferably the height of the internal and/or external parietal corridors is approximately double that of the central corridors.

According to an advantageous embodiment of the invention, on a radially central portion of the exchanger, some partitions concentric or perpendicular to a radius of the turbomachine have an upstream end arranged downstream of the inlet of the exchanger, preferably distant from the inlet of the exchanger by a distance of at least 20% of the length of the exchanger.

This makes it possible in particular to reduce friction from the inlet of the exchanger (in comparison with an exchanger with all the partitions extending from its inlet to its outlet). Since the increase in the section of the corridors and/or the exchanger aimed at reducing the flow speed and therefore friction is not effective from the inlet of the exchanger, this technique of removing the upstream ends is advantageous: it eliminates some friction zones so that a gain in friction is obtained over the entire length of the exchanger.

According to an advantageous embodiment of the invention, in the radially central portion and in a radial direction, one partition out of two has an upstream end coinciding with the inlet of the exchanger, and one partition out of two has an upstream end downstream of the inlet of the exchanger.

This ratio of one partition out of two is a good compromise to both reduce friction and maintain a large heat exchange surface. It also helps to stabilize the slowdown in this first zone at the inlet of the exchanger. Incidentally, the ratio of one out of two avoids penalizing the structural strength of the exchanger.

According to an advantageous embodiment of the invention, the radially central portion extends over a height of approximately two thirds of the height of the exchanger at its inlet. Outside this central zone, the partitions all extend from the inlet of the exchanger.

According to an advantageous embodiment of the invention, in a downstream portion of the exchanger, the radially internal wall is concave and approaches the radially external wall. This concavity allows a local acceleration which causes a reduction in the static pressure at the outlet and thus increases the flow rate in the internal parietal corridor. Alternatively or in addition, a concavity of the same type can be provided on the radially external wall.

According to an advantageous embodiment of the invention, the height of the exchanger increases from its inlet to a maximum height at approximately two thirds of the length of the exchanger and then decreases. This progressive divergence makes it possible to generally slow down the air flow to improve the heat exchange.

According to an advantageous embodiment of the invention, the length of the exchanger is approximately three times its maximum height.

According to an advantageous embodiment of the invention, the exchanger comprises an inlet plane and an outlet plane which form an angle between them of between 5 and 15°. The inlet and outlet planes are defined by the upstream and downstream ends of the partitions. When some partitions are set back from the inlet, the inlet plane is defined by the partitions formed furthest upstream.

According to an advantageous embodiment of the invention, partitions among the hollow or solid partitions are flat and arranged radially.

According to an advantageous embodiment of the invention, partitions among the hollow or solid partitions are curved and concentric, or are flat and perpendicular to a respective radius of the turbomachine.

The invention also relates to an air/oil heat exchanger comprising a radially internal wall, a radially external wall, and partitions, some of which are hollow and through which the oil passes, the partitions and the walls delimiting corridors among which parietal corridors delimited by the walls and the adjoining partitions, and central corridors at a distance from the walls and delimited only by the partitions, the corridors allowing the air flow to pass through the exchanger, remarkable in that at the inlet of the exchanger, the internal parietal corridors and/or the external parietal corridors have a radial height lower than the radial height of the central corridors, and preferably the height of the internal and/or external parietal corridors is half that of the central corridors.

The various details of the advantageous embodiments set out above also apply to this exchanger.

The invention also relates to an air/oil heat exchanger comprising a radially inner wall, a radially outer wall, and partitions, some of which are hollow and through which the oil flows, the partitions and the walls delimiting corridors among which are parietal corridors delimited by the walls and the adjoining partitions, and central corridors at a distance from the walls and delimited only by the partitions, the corridors allowing the air flow to pass through the exchanger, remarkable in that on a radially central portion of the exchanger, some partitions concentric or perpendicular to a radius of the turbomachine have an upstream end arranged downstream of the inlet of the exchanger, preferably distant from the inlet of the exchanger by a distance of at least 20% of the length of the exchanger.

The various details of the advantageous embodiments set out above also apply to this exchanger.

The invention finally relates to a turbomachine comprising an air vein in which an air/oil heat exchanger is arranged, remarkable in that the exchanger conforms to one of the embodiments set out above, and a rotor is arranged upstream of or in the air vein, upstream of the exchanger.

According to an advantageous embodiment of the invention, a stator is arranged downstream of the rotor and upstream of the exchanger, possibly positioned in the air vein.

According to an advantageous embodiment of the invention, directly downstream of the exchanger, the height of the air vein decreases over a distance of at least 30% of the length of the exchanger. This concavity or convergence beyond the exchanger makes it possible to re-accelerate the air flow after it has passed through the exchanger.

According to an advantageous embodiment of the invention, the air flow has a main direction which is inclined at an angle of approximately 20° with the axis of the turbomachine. This makes it possible in particular to multiply the divergence effects of the corridors without increasing their height (since the distance from the axis will influence the circumferential width of the corridors).

Additional Benefits

Generally, each of the details of the embodiments described above acts locally on a mechanism (pressure, speed, flow rate, upstream, downstream, etc.). Each of the details can be considered alone or combined with one or more of the other details. They all aim, to varying degrees, to obtain an efficient heat exchange without hindering the thrust generated by the air flow.

Indeed, the invention makes it possible to increase the heat exchange while limiting the pressure losses of the air flow. In the context of a turbojet oil cooler, this solution becomes particularly relevant since the cold source is at a very low temperature in addition to being available in large quantities.

Some details play on the increase of the flow in the parietal corridors or on the increase of the deceleration of the diffuser upstream of the exchanger, by increasing, via the geometry of the exchanger, the entry speed at the wall.

Others play on the internal diffusion in the exchanger which increases the heat exchange by limiting friction losses.

The invention also makes it possible to distribute the flow rate more uniformly in the different heat exchange corridors over the height of the exchanger; to slow down the speed of the air flow in the corridors as much as possible; and/or to limit the friction surfaces in the areas of higher speeds (the solid line curve in FIG. 1 is shifted to the left and the point of minimum losses is shifted to the left and downwards).

The invention is also structurally rigid, simple and compact, reliable, and convenient to maintain.

DESCRIPTION OF THE DRAWINGS

FIG. 1 shows a graph of pressure losses versus speed;
FIG. 2 illustrates the velocity and pressure profile over the radial height;
FIG. 3 represents a turbomachine according to the invention;
FIGS. 4 and 5 illustrate two possible patterns for the exchanger;
FIG. 6 shows a longitudinal sectional view of the exchanger.

DESCRIPTION OF THE EMBODIMENTS

In the following description, the terms "internal" and "external" refer to a positioning relative to the axis of rotation of an axial turbomachine. The axial direction corresponds to the direction along the axis of rotation of the turbomachine. The radial direction is perpendicular to the axis of rotation. The upstream and downstream refer to the main flow direction of the flow in the turbomachine.

FIGS. 1 and 2 are discussed above.

FIG. 3 illustrates an example of a turbomachine 2 according to the invention. A propeller 4 secured to a hub 6 rotates around a longitudinal axis 14.

The turbomachine 2 moves in an air flow F whose movement relative to the turbomachine 2 is generated by the rotation of the propeller 4 and the advancement of the aircraft on which the turbomachine 2 is mounted.

The air flow F is separated by a first separation nozzle 8 into a radially internal air flow F' and a radially external air flow F2, called the secondary flow.

The radially internal air flow F' passes through a movable wheel 12 which directs the latter towards a second separation nozzle 10 capable of separating the radially internal air flow F' into a primary flow F1 and a tertiary flow F3, the latter being distinct from the secondary flow F2.

The first separation nozzle 8 initiates an inner wall 11 of a casing 30 forming an outer guide wall 11 for the tertiary flow F3. The second separation nozzle 10 initiates an outer wall 13 of a casing 32 forming an inner guide wall 13 of the tertiary flow F3. The walls 11 and 13 delimit a tertiary flow vein 16.

In this example, the tertiary flow F3 passes through a heat exchanger 40 arranged in the tertiary flow vein 16.

The turbomachine 2 further comprises an optional rectifier (not illustrated) composed of stator blades and arranged upstream of the heat exchanger 40 at the level of the tertiary flow vein 16. Advantageously, the rectifier makes it possible to straighten the tertiary flow F3 (which has been propelled by the rotors 4 and 12) before the latter passes through the heat exchanger 40 so that the air flow has a mainly axial direction when it enters the exchanger. The optional rectifier may be preceded, in the vein or upstream of the vein, by a rotor, which may be the rotor 12 drawn in FIG. 3.

The heat exchanger 40 can axially overlap a high-pressure compressor 15 and/or a low-pressure compressor 17, called a "booster" 17. Preferably, the heat exchanger 40 is arranged axially between the low-pressure compressor 17 and the high-pressure compressor 15, that is to say in the vicinity of a swan-neck vein 18 accommodating support arms ("struts").

A "VBV" channel 19 ("Variable Bleed Valve") may have an outlet arranged axially downstream of the heat exchanger 40. The "VBV" channel provides a discharge function by returning part of the primary flow F1 to the tertiary flow F3 to, for example, evacuate any ice particles from the primary flow F1 to prevent clogging of the high-pressure compressor 15, in particular when the flow rate of the primary flow F1 becomes too low.

The tertiary flow F3 passes through the heat exchanger 40 occupying the vein 16 at a speed having a Mach number in an interval from 0.1 to 0.6, generally 0.3.

In the vein 16, upstream of the exchanger 40, a section 20 can be substantially divergent (increasing in section), in order to contribute to the reduction of the speed of the flow F3 upstream of the exchanger 40.

The tertiary flow vein 16 may also comprise a downstream section 22 having a convergent longitudinal section following the tertiary flow F3. Advantageously, this makes it possible to accelerate the tertiary flow F3 at its outlet from the heat exchanger 40, thus joining the secondary flow F2 to promote the thrust of the aircraft.

Advantageously, the "ACOC" 40 heat exchanger allows heat exchange between air and oil, preferably cooling of the oil by air. Indeed, the oil temperature can reach an operating temperature of up to 180° C. and a flow rate of up to 30,000 l/h.

In this regard, the exchanger 40 can provide cooling of the oil used in several components of the aircraft, in particular, an engine, a gearbox, an engine generator and any electronic component requiring cooling.

A single heat exchanger 40 can combine the cooling of several functions or oil circuits of the turbomachine, and this depending on different parameters linked to the need for cooling the oil, i.e. inlet temperatures, flow rates, required outlet temperature or air conditions, the different circuits can be put in thermal contact or well insulated.

Circumferentially, the exchanger 40 can occupy a significant proportion of the vein 16, for example at least 300° of angle, or even 360°. It can be formed of several angular sectors.

The exchanger 40 can be manufactured by additive manufacturing, for example by aluminum powder bed fusion.

By abuse of language, the sections of the walls 11 and 13 at the level of the exchanger are considered to be part of the exchanger, although these sections may be in one piece with the exchanger 40 or alternatively be distinct from the single-piece matrix of the exchanger.

FIG. 4 shows a front view (from upstream) of a portion of the exchanger 40 in a first variant. The axis 14 and the radial direction r are shown in the figure.

The exchanger 40 extends radially over the entire vein 16, that is to say from the internal wall 13 to the external wall 11.

In this example, the exchanger 40 comprises partitions 56 concentric with the axis 14 and flat and radial partitions 58.

The partitions 56, 58 delimit corridors 60, 62, 64. The corridors marked 60 and 62 are corridors that will be called parietal, delimited in part by a wall 11, 13, while the corridors marked 64 are corridors that will be called central. These are delimited only by partitions 56, 58.

The partitions 56 and/or the partitions 58 may be hollow to allow the oil to travel through the interior of these hollow partitions. Thus, a network of hollow partitions whose cavities are connected to each other forms a circuit (or several potentially independent circuits) for the oil from an oil inlet to an oil outlet (not shown).

The partitions 56,58 are heat exchange surfaces between the air and the oil. Partitions that are solid conduct heat in that they function as cooling fins for the oil.

The corridors 60, 62, 64 are through: the air flow F3 which is perpendicular to FIG. 4 enters a corridor at the entrance of the exchanger 40 to leave the exchanger at its exit.

FIG. 5 shows a variant in which the partitions 56, 58 are all flat (or at least have a linear section in the section plane of FIG. 5), the partitions 56 (or their linear section) being perpendicular to a respective radius and the partitions 58 (or their linear section) forming zigzags to constitute corridors 60, 62, 64 of hexagonal section. Since the vein 16 does not have a constant section, the partitions 56, 58 can be formed from successions of elementary planes potentially connected by connecting radii.

It is understood that the exchanger according to the invention may include other corridor patterns, or may combine on several of its portions, the patterns of FIG. 4 and those of FIG. 5.

FIG. 6 shows an exemplary design of the exchanger 40 when all of the improvements individually detailed above are implemented. The exchanger 40 of the invention may independently comprise only one of these improvements or two or more, in any possible combination.

Thus, FIG. 6 represents a portion of the vein 16 and its diffusion conduit 20, as well as the exchanger 40.

The figure shows the partitions 56 which delimit the corridors 60, 62, 64. The partitions 56 have an upstream end (or leading edge) noted 56.1.

The inlet 40.1 and the outlet 40.2 of the exchanger 40 are identified in the figure. The exchanger 40 has a length L in the axial direction (defined by the axis 14). The exchanger 40 has a height H measured radially which varies from H1 at the inlet, to HMAX at an axial position of approximately ⅔ of the length of the exchanger. Then, downstream of these two thirds, the height H decreases, in particular in a portion 40.4 of approximately 30% of L in which the internal wall 13 (and/or the external wall 11) is concave (portion noted 13.1).

The concavity and/or reduction in height may continue downstream of the exchanger on a portion marked 13.2 of a length of vein 16 identified by 16.1 which may also be worth approximately 30% of length L. On this portion 16.1, the height of the vein, marked H16, decreases further.

At the inlet 40.1 of the exchanger 40, a plane P1 coincides with most of the partitions 56. In a portion 40.3 extending over a height H40.3 equal to approximately ⅔ of H1 (and radially approximately in the center), partitions 56 may have an upstream end 56.1 set back from the plane P1, in particular at a distance D of between 20 and 35% of L, preferably close to 20%.

At the exit, a P2 plan materializes the downstream ends of the partitions 56.

The planes P1 and P2 can form an angle α between them of between 5 and 15°. P1 can be perpendicular to the axis 14.

The main direction of the flow F3, represented by an arrow in the middle of the exchanger 40, can be inclined at an angle β relative to the axis 14. This angle can be between 0 and 30° and preferably be close to 20°.

The height of corridors 60, 62, 64 is respectively noted H60, H62 and H64. At entry 40.1, the heights H60 and H62 of the parietal corridors 60, 62 are worth approximately half the height H64 of the central corridors 64. At exit 40.2, the heights H60 and H62 are worth approximately double the height H64 of the central corridors 64.

The parietal corridors 60, 62 diverge, that is to say increase in section, from their entrance to their exit. The equivalent is not true for the central corridors 64, which preferentially maintain a constant section or decrease in section.

FIG. 6 is illustrated schematically with a continuity of the walls 11 and 13. In reality, a section of the walls 11 and/or 13 can be monobloc with an exchanger matrix, which therefore "fills" a void in the walls 11 and 13 of the vein 16. Alternatively, the walls 11 and/or 13 can be continuous and a monobloc matrix can be inserted. A radially internal and/or external passage, intermediate between the monobloc matrix and the casing walls can possibly serve as a by-pass for the air (i.e. the air does not encounter hollow partitions traversed by the oil).

By abuse of language, the term "exchanger" is used in this application both to designate a single-block assembly and all of the parts which allow the air to exchange heat with the oil.

FIG. 6 brings together the following concepts:
the concavity of the wall 13;
the increase in the height of the parietal corridors 60, 62, and their relative height (at the entrance and/or exit) to the central corridors;
the removal of the upstream end of some partitions 56; and
the overall shape of the exchanger 40 which has a section which increases then decreases.

The invention may relate to each of these elements, considered alone. Thus, in addition to the exchangers discussed above, the invention may also relate to an air/oil heat exchanger comprising a radially internal wall, a radially external wall, and partitions, some of which are hollow and traversed by the oil, the partitions and the walls delimiting corridors among which parietal corridors delimited by the walls and the adjoining partitions, and central corridors at a distance from the walls and delimited only by the partitions, the corridors allowing the air flow to pass through the exchanger, remarkable in that, at the outlet of the exchanger, the parietal corridors have a radial height greater than the radial height of the central corridors, and preferably the height of the parietal corridors is approximately double that of the central corridors. Thus, the central corridors have more resistance to the air flow per unit of section, and the flow rate therefore increases accordingly in the parietal corridors.

According to a variant, the invention relates to an air/oil heat exchanger comprising a radially internal wall, a radially external wall, and partitions, some of which are hollow and traversed by the oil, the partitions and the walls delimiting corridors among which parietal corridors delimited by the walls and the adjoining partitions, and central corridors at a distance from the walls and delimited only by the partitions, the corridors allowing the air flow to pass through the exchanger, remarkable in that, in a downstream portion of the exchanger, the radially internal wall is concave and approaches the radially external wall. This concavity allows a local acceleration which causes a reduction in the static pressure at the outlet and thus increases the flow rate in the internal parietal corridor. Alternatively or in addition, a concavity of the same type can be provided on the radially external wall.

According to a variant, the invention relates to an air/oil heat exchanger comprising a radially internal wall, a radially external wall, and partitions, some of which are hollow and traversed by the oil, the partitions and the walls delimiting corridors among which parietal corridors delimited by the walls and the adjoining partitions, and central corridors at a distance from the walls and delimited only by the partitions, the corridors allowing the air flow to pass through the exchanger, remarkable in that the height of the exchanger increases from its inlet to a maximum height at approximately two thirds of the length of the exchanger and then decreases. This progressive divergence makes it possible to generally slow down the air flow to improve the heat exchange.

When combined, the various elements illustrated in FIG. 6 make it possible to divide pressure losses by two compared to an exchanger which is not equipped with these improvements.

The present application distinguishes between parietal corridors and central corridors. However, it is obvious that the skilled person will understand that some progressivity can be provided radially, with intermediate "transition" corridors, between the central corridors and the parietal corridors. These intermediate corridors can have some properties of the parietal corridors (e.g. height ratios, divergence, etc.) and/or some properties of the central corridors (e.g. their height, their recessed upstream edge, etc.).

The invention claimed is:

1. An air/oil heat exchanger, comprising:
   a radially internal wall,
   a radially external wall, and
   a plurality of partitions, some of the partitions are hollow and through which oil passes, the partitions, the radially internal wall, and the radially external wall are delimiting corridors, among which internal parietal corridors and/or external parietal corridors delimited by the radially internal and/or external walls and the adjoining partitions, and central corridors at a distance from the radially internal wall and the radially external wall and delimited only by the partitions, each corridor allowing air flow to pass through the air/oil heat exchanger, wherein the internal parietal corridors and/or the external parietal corridors each define a radial height that increases monotonically from an entrance of the air/oil heat exchanger to an exit of the air/oil heat exchanger, and wherein each of the central corridors defines a central corridor radial height that is maintained constant or decreases from the entrance to the exit.

2. The air/oil heat exchanger according to claim 1, wherein at an inlet of the air/oil heat exchanger, the radial height of the internal and/or external parietal corridors is less than the central corridor radial height.

3. The air/oil heat exchanger according to claim 1, wherein at an outlet of the air/oil heat exchanger, the radial height of the internal and/or external parietal corridors is greater than the central corridors radial height, and a height of the internal and/or external parietal corridors is double that of a height of the central corridors.

4. The air/oil heat exchanger according to claim 1, wherein on a radially central portion of the air/oil heat exchanger, certain partitions concentric or perpendicular to a radius of the turbomachine have an upstream end arranged downstream of an inlet of the air/oil heat exchanger, distant from the inlet of the air/oil heat exchanger by a distance of at least 20% of a length of the air/oil heat exchanger.

5. The air/oil heat exchanger according to claim 4, wherein in the radially central portion and in a radial direction, one partition out of two has an upstream end coinciding with the inlet of the air/oil heat exchanger, and one partition out of two has an upstream end downstream of the inlet of the air/oil heat exchanger.

6. The air/oil heat exchanger according to claim 4, wherein the radially central portion extends over a height of approximately two thirds of the height of the air/oil heat exchanger at the inlet.

7. The air/oil heat exchanger according to claim 1, wherein in a downstream portion of the air/oil heat exchanger, the radially internal wall is concave and approaches the radially external wall.

8. The air/oil heat exchanger according to claim 1, wherein a height of the air/oil heat exchanger increases from an inlet thereof to a maximum height at two thirds of a length of the air/oil heat exchanger then decreases.

9. The air/oil heat exchanger according to claim 1, wherein a length of the air/oil heat exchanger is three times a maximum height thereof.

10. The air/oil heat exchanger according to claim 1, further comprising an inlet plane and an outlet plane which form between them an angle of between 5 and 15°.

11. The air/oil heat exchanger according to claim 1, wherein the plurality of partitions among the hollow or solid partitions are flat and arranged radially.

12. The air/oil heat exchanger according to claim 1, wherein the plurality of partitions among the hollow or solid partitions are curved and concentric, or are flat and perpendicular to a respective radius of the turbomachine.

13. A turbomachine, comprising:
    an air vein in which the air/oil heat exchanger of claim 1 is arranged, and
    a rotor is arranged upstream of or in the air vein, upstream of the air/oil heat exchanger.

14. The turbomachine according to claim 13, further comprising:
    a stator arranged downstream of the rotor and upstream of the air/oil heat exchanger and positioned in the air vein.

15. The turbomachine according to 13, wherein directly downstream of the air/oil heat exchanger, a height of the air vein decreases over a distance of at least 30% of a length of the air/oil heat exchanger.

16. The turbomachine according to claim 13, wherein the air flow has a main direction which is inclined at an angle of 20° with an axis of the turbomachine.

17. The air/oil heat exchanger according to claim 2, wherein the height of the internal and/or external parietal corridors is half that of the central corridors.

* * * * *